May 31, 1949.　　　　W. P. COUSINO　　　　2,471,814
PLASTIC INJECTION APPARATUS AND METHOD
Filed May 10, 1946　　　　　　　　　　　　3 Sheets-Sheet 1

INVENTOR.
Walter P. Cousino.
BY
Harness & Harris
ATTORNEYS.

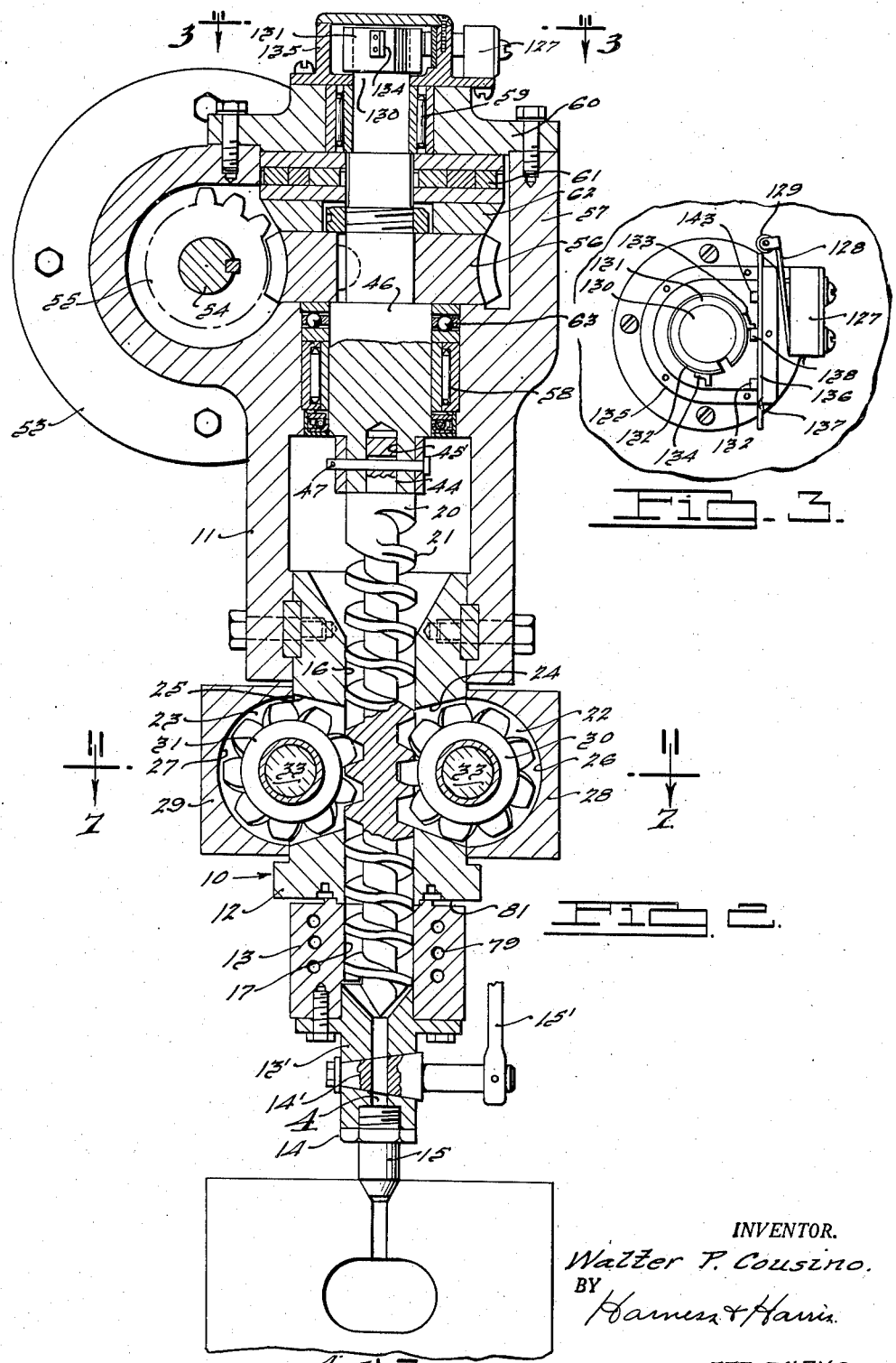

May 31, 1949. W. P. COUSINO 2,471,814
PLASTIC INJECTION APPARATUS AND METHOD
Filed May 10, 1946 3 Sheets-Sheet 3
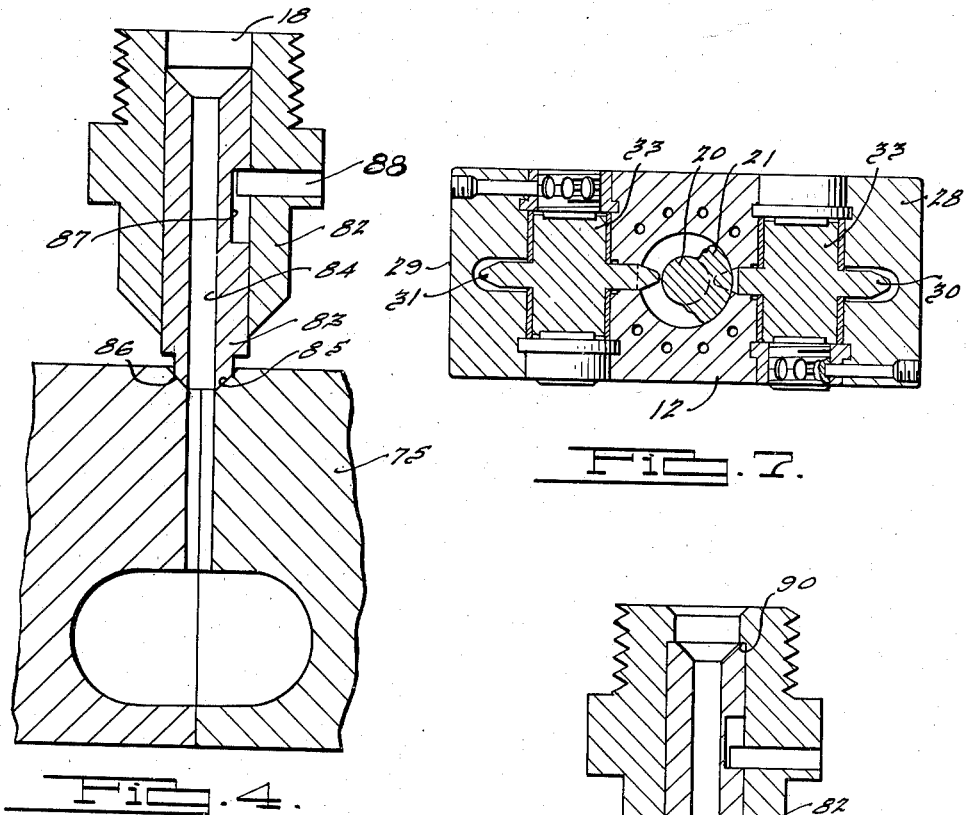
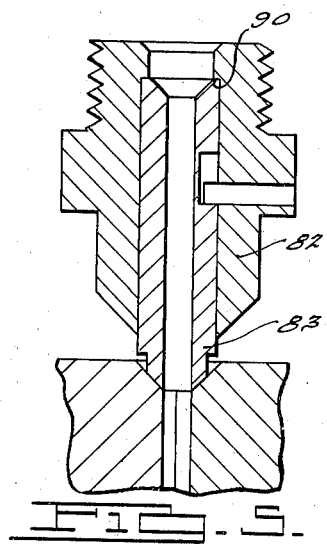
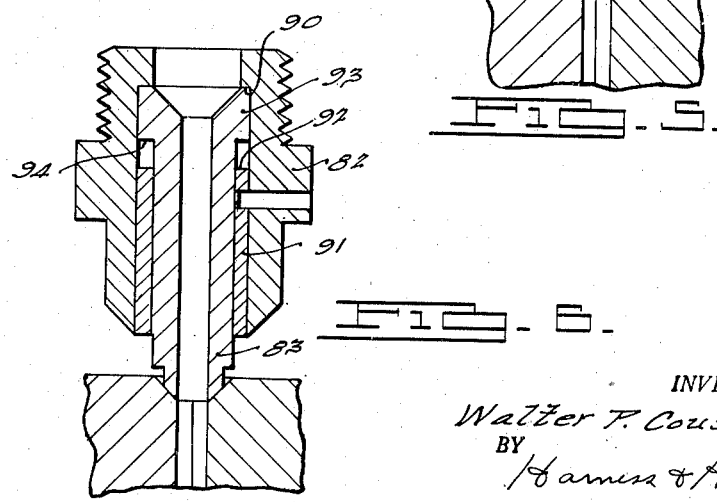
INVENTOR.
Walter P. Cousino.
BY
Harness & Harris.
ATTORNEYS.

Patented May 31, 1949

2,471,814

UNITED STATES PATENT OFFICE 2,471,814

PLASTIC INJECTION APPARATUS AND METHOD

Walter P. Cousino, Detroit, Mich., assignor to Chrysler Corporation, Highland Park, Mich., a corporation of Delaware Application May 10, 1946, Serial No. 668,913

14 Claims. (Cl. 18—30)

This invention relates to an improved apparatus for and method of injection molding and is an improvement upon the injection molding apparatus and methods disclosed in my co-pending applications Serial Nos. 471,693, now Patent No. 2,402,805, 521,197, and 556,119, filed January 8, 1943, February 5, 1944, and September 28, 1944, respectively.

More particularly, the invention relates to an improved nozzle structure which may be advantageously used in injection molding of plastic compounds of both thermoplastic and heat curable types which shrink during conversion from a relatively flowable to a solid state.

The molding apparatus embodying the invention comprises generally a relatively shiftable injecting unit and mold having a nozzle and mold inlet, respectively, which are brought into and out of mold-filling relation by such relative shifting movement. The apparatus is provided with mechanism for releasably, yieldably, relatively urging the mold and injecting unit together in order to retain the nozzle of the injecting unit and inlet of the mold in mold-filling relation. This mechanism is adapted to accommodate relatively slight separatory movement of the injecting unit and mold under the action of the pressure on the contents of the mold when the mold is filled. Such relative separatory movement is relied upon to actuate certain control mechanism, with which the injecting unit is provided, for the purpose of simultaneously discontinuing operation of the main plastic displacing means of the injecting unit and operating valve means on the up-stream side of the nozzle for cutting off the flow of compound from the displacing means to the nozzle and reverse flow of compound from the mold through the nozzle.

One of the main objects of the invention is to provide in injection molding apparatus of this character an improved nozzle structure which maintains pressure upon the contents of a filled mold throughout that period following the mold-filling operation during which shrinkage occurs as the contents of the mold undergo setting action.

Another object of the invention is to provide an injection nozzle of this character which supplements the contents of the mold during shrinking of the compound therein as the compound sets in order to compensate for such shrinkage while the main compound displacing means of the injecting unit is inoperative.

A further object of the invention is to provide an extensible and contractable nozzle in injecting apparatus of this character having a part which remains in pressure communicative relationship with the mold inlet after the injecting unit and mold have been urged apart by the pressure of the compound in a filled mold.

Another object of the invention is to provide in a nozzle of this kind, a contractable chamber from which compound is displaced from the nozzle into the mold under the force by which the injecting unit and mold are urged together after operation of the main compound displacing mechanism has ceased, following a mold-filling operation.

A still further object of the invention is to provide improved control mechanism for injecting apparatus of this character which simultaneously discontinues compound discharging operation of the main compound displacing means and closes the passage in the injecting apparatus leading to the nozzle and thereafter maintains the force by which the injecting unit and mold are urged together for a predetermined period in order to utilize this force for the purpose of retaining the compound in the nozzle chamber under pressure and holding the nozzle in pressure communicating relation to the mold inlet during at least initial setting of the compound in the mold.

A still further object of the invention is to provide improved control mechanism of this kind which will accommodate the approaching movement of the injecting unit and mold which contracts the nozzle chamber, without bringing the compound displacing mechanism and valve control means into actuation.

Another object of the invention is to provide in an injecting unit control system mechanism which will cause the compound displacing apparatus and valve opening device to function during only alternate approaching movements of the relative shiftable mold and injecting unit.

An illustrative embodiment of the invention is shown in the accompanying drawings, in which Fig. 1 is a fragmentary, side elevational view of injecting apparatus embodying the invention.

Fig. 2 is a vertical sectional view taken on line 2—2 of Fig. 1.

Fig. 3 is a fragmentary, plan view of the injecting apparatus shown in Figs. 1 and 2, as viewed from line 3—3 of Fig. 1.

Fig. 4 is an enlarged, fragmentary vertical sectional view on the line 4—4 of Fig. 2 showing details of construction of the nozzle of the injecting apparatus.

Fig. 5 is a sectional view similar to Fig. 4 but illustrating a nozzle structure embodying a modified form of the invention.

Fig. 6 is a sectional view similar to Figs. 4 and 5 but showing a nozzle structure which embodies a still further embodiment of the invention.

Fig. 7 is a horizontal sectional view taken on line 7—7 of Fig. 2.

Figure 1:
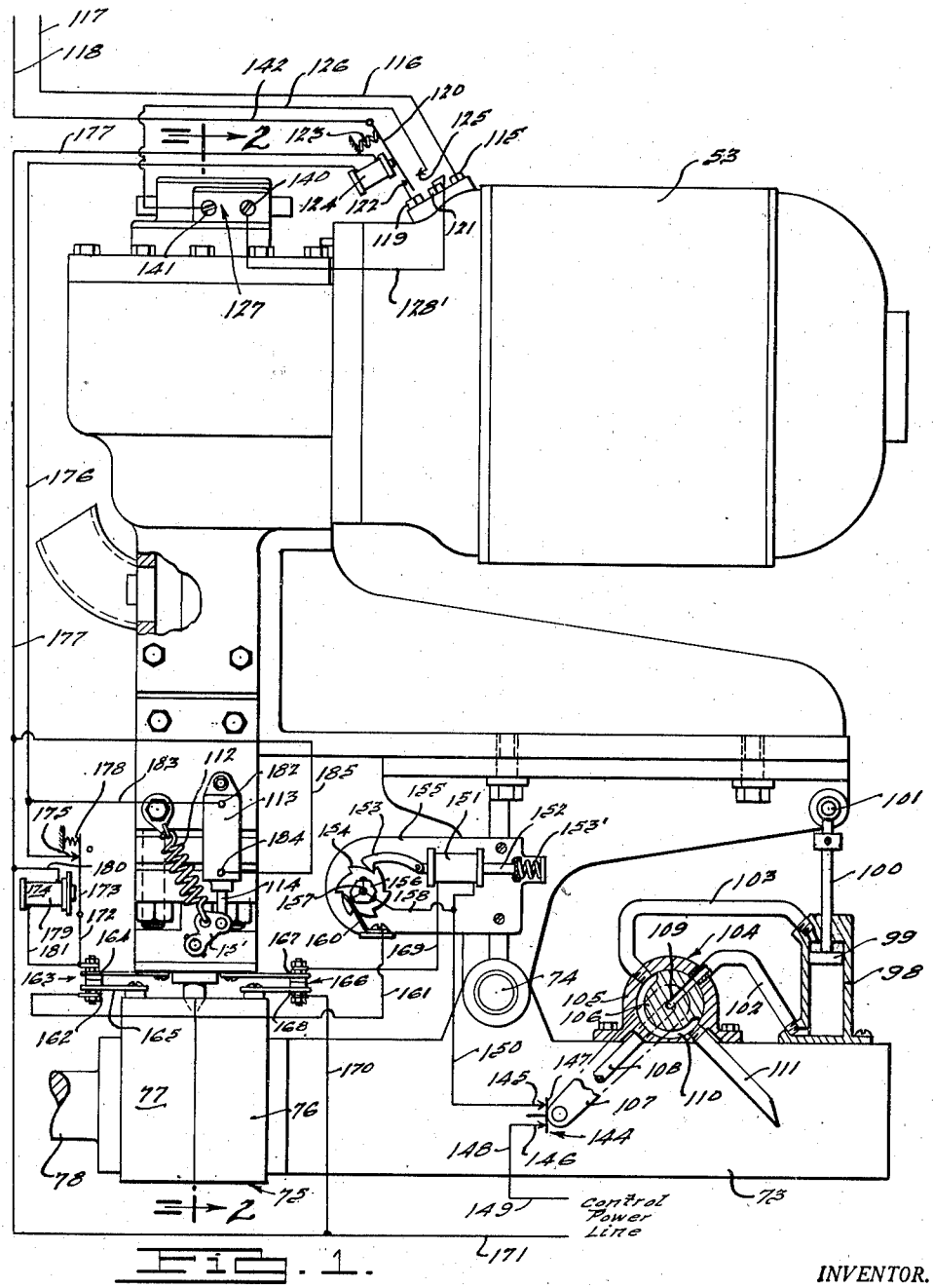

In the forms of the invention shown in the drawings, the injecting apparatus comprises a tubular body portion, shown in Fig. 2, generally designated by the numeral 10, and having an upper section 11, an intermediate section 12, and a heating chamber 13 to which is attached a valve body 13' having a valve element 14' provided with an operating lever 15'. A nozzle body 14 having a discharge nozzle element 15 located at its extreme end is mounted on the lower end of the valve body 13.

The intermediate section 12 is provided with a bore 16 which is axially aligned with the passage 17 in the heating chamber as well as with the entrance passage 18 of the nozzle. A conveyor-like screw 20 extends through the bore 16 and is provided with a thread 21 which relatively closely fits the wall of the bore 16 and which extends through the interior of the upper section 11 to a location adjacent the valve body 13'. Provided on respectively opposite sides of the bore 16 are chambers 22 and 23 which are formed in part by slots 24 and 25, respectively, provided through the wall structure of the intermediate section 12, and in part by recesses 26 and 27 of caps 28 and 29, respectively, which are mounted on the sides of the intermediate section 12 in alignment with the slots 24 and 25 thereof.

Rotatably mounted in each chamber 22 and 23 is a gear-like element 30 and 31, respectively, having teeth meshed with the thread 21 of the screw 20 in a worm and gear relationship. Each of the gears 30 and 31 have bosses 33 extending from their opposite sides which are journalled in apertures 34 formed partially in the wall structure of the intermediate section 12 and partly in the caps 28 and 29. The bosses 33 are rotatably received within bearing elements 35 disposed in the apertures 34 which are held against axial displacement from the apertures 34 by plugs 36 and 37. The plug 36 comprises a metal disc having its peripheral portion seated in a groove 38 formed in the wall structure of the intermediate section 12 and associated cap. The plug 37 comprises a metal sleeve having a radially extending flange 39 seated in a groove 40 similar to the groove 38. The plug 37 is provided with a central threaded aperture in which a threaded plug 41 is disposed. The plug 41 engages the extremity of one boss 33 of each gear and serves to hold the opposite extremity of the other boss 33 thereof against an abutment 42 provided on the inner side of the plug 36.

The gears 30 and 31 serve as rotatable dams and the teeth thereof extend into the groove of the thread 21 of the screw 20 to positively oppose turning of material operated upon by the thread of the screw with the latter. In this manner, a pressure is positively built up upon the material within the bore 16 of the intermediate section 12, as well as upon the material contained in the passage 17 of the heating member 13. The teeth of the gears 30 and 31 are meshed with the thread 21 of the screw 20 at a location spaced from the inlet end 43 of the intermediate section 12. There is at least one complete full turn of the thread of the screw 20 which is in close fitting relationship with respect to the wall of the bore 16 between the inlet end of the bore 16 and the location at which the slots 24 and 25 communicate therewith. With this construction any material operated upon by the screw which is displaced from the bore 16, by reason of its being carried between the teeth of the gears 30 and 31, is returned to the bore at a location at which the material is at least initially compressed by the thread of the screw. Therefore, the moldable material which thus flows through the chambers 22 and 23 is not removed from a zone of high pressure to a zone of atmospheric pressure and accordingly compressive work which has been done on this material is not lost.

The screw 20 has a shank 44 on its upper extremity of substantially square cross section which is received in a correspondingly shaped socket 45 of a spindle 46. A pin 47 extends through openings in the wall of the socket 45 and a registering opening 48 in the shank 44 for holding the screw against displacement from the spindle. The injecting unit is provided with mechanism for driving the screw which includes a motor 53 having a shaft 54 provided with a worm 55 which is meshed with a worm gear 56 keyed to the spindle 46. The motor 53 is supported by and the transmission gearing is disposed within a housing 57 spaced vertically from the intermediate section 12 of the injecting apparatus by the tubular structure, heretofore referred to as the upper section 11 of the injecting apparatus, which is preferably formed integral with the transmission housing. The spindle is rotatably supported by spaced rolling contact bearing units 58 and 59 mounted in the housing 57 and cover plate 60 of the latter, respectively. A thrust bearing unit 61 disposed between the cover plate and a spacer 62 which bears upon one side of the worm gear 56, opposes axial movement of the latter in one direction and a thrust bearing unit 63 disposed between the bearing unit 58 and the other side of the gear opposes axial movement of the worm gear in the opposite direction.

When the injecting apparatus is used in mold-filling operations it is preferably pivotally mounted on a support 73 for rocking movement about an axis 74 into and out of mold-filling relationship with respect to a die or mold generally designated by the numeral 75. For the purpose of illustration, the mold is shown in the drawings to include separable parts 76 and 77 mounted on the support 73 and on a shiftable ram 78, respectively.

The material to be injected may be heated while it is in the injecting apparatus in any suitable manner. An electric heating element 79 may be provided in the wall structure of the heating chamber 13 or the wall structure of the latter may be cored out to accommodate supply of any suitable heating medium. A gap 81 is preferably provided between the main portions of the adjacent ends of the intermediate section 12 and heating chamber 13 in order to reduce the transmission of heat from the latter to the material in the vicinity in which it is being initially placed under compression.

The discharge nozzle 15 comprises a tubular body part 82 in which is formed the entrance passage 18. A tubular discharge section 83 is axially slidably mounted in the passage 18 of the body portion 82 and provided with a central discharge passage 84 which is adapted to feed moldable material into the inlet opening 85 of the mold 75. The inlet opening 85 has a bevelled seat with which a correspondingly bevelled end portion 86 provided on the outer extremity of the discharge section 83 of the nozzle is adapted to register. In order to prevent separation of the inner discharge section 83 of the nozzle from the body portion 82 thereof and to limit axial movement of the discharge section 82 with respect to the body portion, a recess 87 is provided in the side of the discharge section 83 for receiving a pin 88 mounted in the wall of the body portion 82. The upper and lower ends of the recess 87 abut opposite side portions of the pin 88 and thus establish the lower and upper limits of movement, respectively, of the discharge section relative to the body portion of the nozzle. When the injecting unit and mold are in the mold-filling relationship shown in Figs. 1 and 2, the nozzle is urged toward the mold as hereinafter more clearly set forth and the parts of the nozzle are held in contracted position by the force with which the nozzle is urged toward the mold. The parts of the nozzle remain in contracted position during the mold-filling operation and until the mold is completely filled. When the mold is completely filled, further momentary displacement of compound from the pressure chamber of the injecting unit extends the nozzle to the position shown in Fig. 4. As hereinafter more clearly set forth, discharge rotation of the screw is discontinued and the valve 14' is closed when the nozzle is extended by the action of the pressure created by the screw immediately after the mold is completely filled. When the mold has thus been filled and discharge operation of the screw 20 has been discontinued and the valve 14' has been closed, the force by which the injecting unit is urged, as hereinafter set forth, in a counterclockwise direction, as viewed in Fig. 1, about its pivotal axis 74, retains the compound in the mold under pressure while it is being set either by a heat curing or cooling action. Inasmuch as many moldable compounds of the type capable of being injected by the improved apparatus, shrink upon solidifying, the force by which the nozzle body 82 is urged downwardly, as viewed in Fig. 4, causes contraction of the discharge section 83 which displaces moldable material from the nozzle into the mold inlet so as to compensate for such shrinkage and to maintain the contents of the mold under uniform pressure during the solidifying stage.

In Figs. 5 and 6 are shown two modifications of the nozzle structure illustrated in Fig. 4. In the form shown in Fig. 5 the nozzle body 82 is provided with a shoulder 90 which is adapted to engage the inner end of the shiftable section 83 of the nozzle when the nozzle is in its contracted condition. Engagement of the inner end of the shiftable discharge section 83 of the nozzle with the shoulder 90 forms a seal which serves to prevent the flow of material being discharged through the nozzle between the engaged surfaces of the body portion 82 and discharge section 83 of the nozzle.

In the form of the invention illustrated in Fig. 6 the body portion 82 of the nozzle is provided with a shoulder 90 against which the inner extremity of the shiftable discharge section 83 of the nozzle abuts, as in the form shown in Fig. 5. However, in this form of the invention there is provided between the body portion 82 of the nozzle and the shiftable discharge section 83 thereof a sleeve or collar 91 having an upper extremity 92 spaced from the shoulder 90. The shiftable section 83 of the nozzle is provided with a head portion 93 which is disposed between the shoulder 90 of the body portion of the nozzle and the upper extremity 92 of the sleeve 91. When the nozzle is in contracted condition, the upper extremity of the shiftable section 83 thereof bears against the shoulder 90 to form a seal against admission of moldable material between the nozzle body and shiftable section. The upper extremity 92 of the sleeve 91 abuts a shoulder 94 formed on the head part 93 of the shiftable section 83 to limit outward extension of the shiftable section 83 with respect to the body portion 82 of the nozzle. Engagement of the surfaces 92 and 94 occurs when the nozzle is in its maximum extended condition and serves to prevent the flow of moldable material beyond the location of these engaged surfaces.

The injection molding apparatus which is provided with the improved nozzle for compensating for shrinkage which occurs during solidification of moldable material in a mold is provided with a control system which serves to accommodate displacement of a small charge of moldable material from the nozzle after the mold has been initially filled. This control apparatus is best shown in Figs. 1 and 2. It includes a cylinder 98 mounted on a support 93 in which is slidably disposed a piston 99. The piston 99 has a piston rod 100 which is pivotally attached at 101 to the injecting unit on the right hand side of the pivotal axis 74, as viewed in Fig. 1. Fluid pressure may be admitted to the lower end of the cylinder 98 by a conduit 102 in order to urge the piston 99 upwardly and thus rotate the injecting unit in a counter-clockwise direction about its pivotal axis 74. Fluid pressure may be admitted to the upper end of the cylinder 98 through a conduit 103 in order to rotate the injecting unit in a clockwise direction about its pivot 74. The conduits 102 and 103 are connected with a valve, generally designated by the numeral 104, which includes a housing structure 105 having a rotatable valve element 106 journalled therein. An operating lever 107 is attached to the rotatable valve element 106 for rotating the latter to selectively admit fluid under pressure to either of the conduits 102 or 103. When the valve is in the position shown in Fig. 1, fluid is supplied through the inlet pipe 108 to the passage 109 of the valve element 106 and from the passage 109 to the conduit 102. The conduit 103 is connected with atmosphere by an exhaust groove 110 formed in the rotatable valve element 106 and through a conduit 111 which communicates with the groove 110. When the valve element 106 is rotated in a counter-clockwise direction, as viewed in Fig. 1, the passage 109 of the rotatable valve element is brought into communication with the conduit 103 and fluid pressure is supplied to the upper end of the cylinder 98, while the groove 110 is brought into communication with the conduit 102 for the purpose of exhausting fluid pressure from beneath the piston 99. Movement of the nozzle of the injecting unit into and out of mold-filling relationship with respect to the mold may be effected by control of the valve 104.

The valve element 14' is normally urged toward its closed position by a spring 112 which is attached to the valve lever 15. The valve 14' may be opened against the action of the spring 15 by a solenoid 113 which is mounted on the injecting unit and connected by a rod 114 with the valve lever 15.

The motor 53 by which the screw 20 is driven is of a reversible driving type and is provided with a terminal 115 which is connected by a conduit 116 with one conductor 117 of a power line. The other conductor 118 of the power line is adapted to be connected with a terminal 119 of the motor through a switch comprising a switch element 120 in order to establish rotation of the motor to drive the screw in a forward pressure-creating direction. The switch element 120 is normally urged out of contact with a fixed switch element 122, connected with the terminal 119 of the motor, by a spring 123 and is adapted to be urged against the action of the spring 123 into engagement with the contact 122 by a solenoid 124. When the solenoid 124 is de-energized, as hereinafter set forth, the movable switch element 120 is urged in a counter-clockwise direction as viewed in Fig. 1 until it engages a contact 125 which is connected by a conductor 126 through a switch, generally designated by the numeral 127, with a conductor 128' which is connected with the reverse terminal 121 of the motor 53. The switch 127 is adapted to maintain reverse operation of the motor and accordingly reverse pressure-relieving driving of the screw 20 throughout a predetermined portion of a rotation of the screw. The switch mechanism 127 is substantially identical to that shown in applicant's copending application Serial No. 521,197 and it includes an operating lever 128 on the free end of which is provided a roller 129. This switch is associated with switch-actuating mechanism which is responsive to rotation of the spindle 46 by which the screw 20 is drivingly rotated. The switch-operating mechanism, shown in Fig. 8, comprises a rotor 130 which consists of an integral extension of the spindle 46. The rotor 130 is surrounded by a split ring 131 comprising frictional material having a split metal band 132 on its outer periphery. The band 132 preferably comprises resilient metal, such as spring steel, and is conditioned to frictionally urge the frictional material 131 against the periphery of the rotor 130. Mounted on the metal band 132 are arcuately spaced brackets 133 and 134 having outwardly extending flanges. The rotor 130 is disposed within a housing 135 in which is shiftably mounted a slide bar 136. The end portions of the slide bar 136 extend outwardly of the housing 135 through slots 137 formed in the wall of the housing. The upper end of the bar 136 is adapted to engage the roller 129 of the switch lever 128 and to move the latter to its switch-opening position when this bar is shifted upwardly, as viewed in Fig. 3.

Forward rotation of the screw 20 and of the rotor 130 is in a clockwise direction, as viewed in Fig. 3. During this clockwise rotation of the rotor 130, which occurs while the material is being discharged from the apparatus, the outwardly extending flange of the bracket 133 on the metal band 132 abuts the upper side of a lug 138, as viewed in Fig. 3, which extends leftwardly from the slide bar 136. Engagement of the bracket 133 with the lug 138 prevents further rotation of the band 132 and frictional material 131 attached thereto in a clockwise direction with the rotor 130. The rotor 130 and screw 20 with which it is connected may thus continue to rotate in a clockwise direction while the bracket 133 of the split band 132 holds the slide bar 136 in its downward limiting position, as viewed in Fig. 3, which is established by engagement of a stop 139 carried by the slide bar, with the housing 135, as illustrated in Fig. 3. Thus, during and following a discharge operation of the machine, the contacts (not shown) of the switch 127 are maintained closed.

The switch 127 is provided with a terminal 140 which is connected by the conductor 128' with the center terminal 121 of the motor 53. Another terminal 141 on the switch 127 is connected by the conductor 126 with the fixed switch contact element 125 which is adapted to be engaged by the movable switch element 120 when the solenoid 124 is de-energized. Engagement of the movable switch contact element 120 with the fixed switch element 125 completes a circuit, when the switch 127 is closed as above described, through the motor 53 which drives the motor in a reverse direction. This reverse driving circuit is established by current supplied from the conductor 117 of the power line to the terminal 115 of the motor 53, through the motor and from the terminal 121 of the motor through the switch 127, conductor 126, engaged switch elements 120 and 125, and through a conductor 142 leading from the movable switch contact element 120 to the conductor 118 of the power line.

A reverse operation of the motor 53 rotates the rotor 130 in a counterclockwise direction, as viewed in Fig. 3, and the split band 132 and frictional material 131 are carried with it in a counterclockwise direction, bringing the flange 134 into engagement with the lower side of the lug 138. Further counter-clockwise rotation of the split band 132 and bracket 134 shifts the slide bar 136 upwardly, as viewed in Fig. 3, until a stop 143 mounted on the slide bar engages the wall of the housing 135 to establish the limiting upward position of the slide bar. As the slide bar 136 is moved to its extreme upward limiting position, as viewed in Fig. 3, its external end portion engages the roller 129 of the switch lever 128 and rotates the latter to its off position, thereby breaking the circuit to the terminals 121 and 115 of the motor 53. When the circuit leading to the motor terminals 121 and 115 is thus broken, reverse drive operation of the motor and screw 20 is discontinued. The duration of the reverse drive operation may be predetermined by suitably locating the brackets 133 and 134 in angularly spaced relationship with respect to each other. During initial driving of the apparatus in a forward discharging direction, the bracket 133 engages the left side of the lug 138 and returns the slide bar 136 to its lowermost position, illustrated in Fig. 3, causing the switch 127 to be closed in preparation for the next reverse driving operation which does not immediately take place inasmuch as the switch contacts 120 and 125 are separated during the forward drive of the motor 53 and screw 20, as hereinafter more clearly set forth.

The control apparatus includes means for automatically starting the motor in its forward driving operation when the nozzle 15 of the injecting unit is brought into mold-filling relationship with respect to the inlet 85 of the mold 75 at the commencement of a mold-filling operation. This control apparatus also functions to discontinue the forward drive of the motor when the mold is filled and to initiate a reverse drive operation of the motor. As previously set forth, upon completion of filling of the mold, the nozzle 15 is extended in response to pressure of the material in the mold and this extension of the nozzle is accommodated by pivotal movement of the injecting apparatus in a clockwise direction, as viewed in Fig. 1, about its pivotal axis 74. This clockwise pivotal movement of the injecting unit occurs against the fluid pressure on the underside of the piston 99 and therefore the injecting unit is urged by the piston 99 in a clockwise direction, which action tends to contract the nozzle 15. Such contraction of the nozzle takes place as the material in the mold shrinks during setting, thus compensating for shrinkage and maintaining pressure on the contents in the mold in the manner previously set forth. During such contraction of the apparatus is moved towards its mold-filling relationship with respect to the mold, and provision is made in the control apparatus for preventing unintended initiation of the mold-filling cycle during this relative approaching movement of the injecting unit and mold, which is relied upon to contract the nozzle and displace moldable compound from within it.

The foregoing functions are accomplished by the control system which, in addition to the above described apparatus, includes a switch, generally designated by the numeral 144, having fixed contacts 145 and 146 and a movable contact element 147 The movable contact element 147 is engageable by the operating lever 107 of the valve mechanism 104, and is adapted to be moved thereby into closed position with respect to the contacts 145 and 146, when fluid pressure is admitted by the valve 104 to the lower end of the cylinder 98. The fixed contact 146 is connected by a conductor 148 with one conductor 149 of a control power line. The other fixed contact 145 of the switch 144 is connected by a conductor 150 with a solenoid coil 151. Shiftably mounted within the solenoid coil 151 is an armature 152 which is normally yieldably urged leftwardly, as viewed in Fig. 1, by a spring 153'. Pivotally mounted on the left end of the armature 152 is a dog 153 which is adapted to cooperate with a ratchet wheel 154 journalled on a bracket 155 which is carried by the injecting unit. The coil 151 and spring 153' are also mounted on the bracket 155. The ratchet wheel 154 has a hexagonal-shaped block of electrical insulating material 156 co-axially mounted upon it and fixed to it. Alternate sides of the hexagonal block 156 are provided with contact elements 157, all of which are connected with a conductor 158 which is in turn electrically connected with the conductor 150. A brush-like contact element 160 mounted on the bracket 155 is electrically connected by a conductor 161 with a switch contact element 162 of a switch, generally designated by the numeral 163. The switch 163 has a movable contact element 164 which is mounted on and adapted to move with the injecting unit. The switch element 161 is mounted on the mold structure 175 by a resiliently yieldable strip 165.

In order to complete a circuit through the coil 151 only when the mold and injecting unit are in a predetermined close relationship with respect to each other, such as is produced by the relative approaching movement of the injecting unit and mold which occurs during contraction of the nozzle, a switch, generally designated by the numeral 166, is provided which has a movable contact element 167 mounted on the injecting unit and a relatively fixed contact element 168 mounted on the mold. The contact element 167 is electrically connected by a conductor 169 with the other terminal of the coil 151. The switch contact element 168 is electrically connected by a conductor 170 with the other conductor 171 of the control power line Movable switch contact element 164 of the switch 163 is connected by a conductor 172 with a movable switch element 173 of a delayed action relay, generally designated by the numeral 174. A fixed contact element 175 of the switch of the delayed action relay 174 is electrically connected by a conductor 176 with one terminal of the solenoid 124 by which the forward and reverse drive establishing switch, previously described, is operated. The other terminal of the solenoid 124 is connected by a conductor 177 with the conductor 171 of the control power line. The delayed action relay 174 includes a spring 178 which normally urges the movable element 173 to its open position. This delayed action relay also includes a solenoid coil 179 having one terminal connected by a conductor 180 to the conductor 177 which leads to the conductor 171 of the control power line. The other terminal of the solenoid 179 of the delayed action relay is connected by a conductor 181 with the movable switch element 164 of the switch 163.

The solenoid 113 which operates the valve 114' of the injecting apparatus has a terminal 182 electrically connected by a conductor 183 with the conductor 176 and it has another terminal 184 connected by a conductor 185 with the conductor 177.

In operation of the improved injection molding apparatus and its control system, the following sequence of steps and operations occur. As shown in Fig. 1, the apparatus and control system are in condition to drive the structure 20 in its forward discharge direction in order to fill the cavity of the mold with moldable material and the valve 14' is opened to accommodate the discharge of such moldable material. The injecting unit had thus been previously moved to the position shown in Fig. 1 by operation of the control lever 107 of the valve mechanism 104 which admitted fluid to the lower end of the cylinder 98 As the lever 107 was moved to the position shown in Fig. 1, it closed the switch 144 and as the injecting unit was rotated to mold filling relationship with respect to the mold by the action of the piston 99, the switch 166 was closed. This established a circuit from the conductor 149 of the power line through the coil 151 to the conductor 171 of the power line, thus energizing the coil 151 and consequently moving the armature 152 rightwardly against the action of the spring 153'. This action caused the dog 153 to index the ratchet 154 a distance corresponding to one tooth of the ratchet, thereby bringing the contact element 157 on the hexagonal block 156 into engagement with the brush contact element 160. This indexing of the ratchet occurred during the relative approaching movement of the injecting unit and mold and during the same approaching movement the switch 163 was also closed. Engagement of a contact 157 on the hexagonal block 156 with the brush contact element 160 and closing of the switch 163 supplied current from the conductor 149 of the control power line through the conductors 150, 158, 161 and 181 to the coil 179 of the delayed action relay 174. After the predetermined interval required to operate the delayed action relay 174, a circuit was also completed through the switch elements 173 and 175 of the delayed action relay 174 to the coil 124 of the direct and reverse drive control switch. Excitation of the coil 124 moved the movable switch element 120 into engagement with the fixed switch element 122, thereby establishing the forward drive of the motor 53 and screw 20. All of the foregoing control operations, as previously stated, took place as the injecting unit and mold came into mold-filling relation and during this relative approaching movement of the injecting unit and mold a circuit was also completed through the solenoid 113 which controls the valve 14' of the injecting unit, this latter circuit being completed by reason of the closed conditions of the switches 144, ratchet switch having contact elements 160 and 157, switch 163 and the switch of the delayed action relay including contacts 173 and 175.

From the foregoing description of the manner in which the control apparatus was placed in the condition shown in Fig. 1, it will be seen that coincidental with relative shifting of the injecting apparatus and mold into mold-filling relationship, the valve 14' is opened and the motor 53 is conditioned to drive the screw 20 in its forward discharging direction. The valve 14' remains open and the motor 53 continues to drive the screw 20 until the mold is filled. Upon completion of filling of the mold the back pressure applied by the discharged moldable material urges the injecting unit in a counter-clockwise direction about its pivot 74 and against the action of the piston 99, thereby accommodating extension of the extensible nozzle 15. This relative pivotal movement of the injecting unit and mold causes both switches 163 and 166 to open. When the switch 163 is opened, the coil 179 of the delayed action relay 174 is de-energized and the spring 178 of this relay separates the switch contact elements 173 and 175. Thus, the supply of current to both the valve control coil 113 and the reversing switch control coil 124 is discontinued. The spring 112 shifts the valve 14' to its closed position and the spring 123 of the forward and reverse drive control switch moves the movable contact 120 into engagement with the fixed contact 125. Since, as above described, the switch 127 is closed following forward drive operation of the screw 20, the motor 53 is reversed for a predetermined period of reverse driving operation. This reverse driving of the screw 20 by the motor 53 relieves the pressure upon the moldable compound in the injecting apparatus on the upstream side of the valve 14' thereof. Relieving of the pressure on the moldable material at this location in the apparatus prevents unintended setting of the compound in the apparatus, as clearly set forth in applicant's copending application Serial No. 521,197.

After the motor has driven the screw in its reverse pressure-relieving direction for a predetermined interval established by the control switch 127 and its previously described operating mechanism, operation of the motor is discontinued and the content of the mold is solidified either by heating if the moldable material is of a thermosetting nature, or by cooling if it is thermoplastic. During this solidification of the mold content, the fluid pressure on the under side of the piston 99 continues to urge the injecting unit in a counterclockwise direction about its pivot 74, thus tending to contract the extensible nozzle 15, which action maintains the contents of the mold under pressure. Any shrinkage of the material in the mold which occurs during its solidification or setting is compensated for by contraction of the nozzle and displacement of compound from within it. As the nozzle contracts, the injecting unit approaches the mold and the switches 163 and 166 are again closed. It is not intended that circuits be re-established through the coils 113 of the discharge valve operating mechanism and 124 of the forward and reverse control switch for opening of the valve 14' and further operation of the screw is not desired at this stage. The control mechanism guards against this occurrence by breaking the circuit at the ratchet control unit. When the switch 166 is opened in response to pressure of the contents of the mold following completion of a mold-filling operation, the solenoid 151 of the ratchet mechanism is de-energized and the spring 153' shifts the armature 152 leftwardly, as viewed in Fig. 1, to position the dog for performing another indexing operation.

The moment contact is re-established during contraction of the nozzle between the contact elements 167 and 168 of the switch 166, current momentarily flows through the coil 151 and shifts the armature 152 leftwardly, thus indexing the hexagonal block 158 one step which brings the brush contact 160 out of engagement with the contact member 157 and into engagement with one of the sides of the hexagonal insulating block 156 which is disposed between two successive contact elements 157. During that interval of time the coil 151 is excited for the purpose of indexing the ratchet mechanism, current is also supplied to the coil 179 of the delayed action relay, but since the delayed action relay is predetermined in construction to require a greater length of time to close the switch of the delayed action relay than that required to index the ratchet mechanism one step, the circuit is interrupted between the brush element 160 and one of the contact elements 159 of the ratchet mechanism before the contacts 173 and 175 of the delayed action relay are closed. Thus the latter contacts are never closed while the brush element 160 is not engaged with one of the contact elements 150 of the ratchet mechanism and, accordingly, the control system permits approaching movement of the injecting unit and mold during contraction of the nozzle 15 without bringing the motor 53 into operation and without opening the valve 14'. The control system therefore causes operation of the motor 53 in a forward driving direction and produces opening of the valve 14' during only every alternate relative approaching movement of the mold and injecting unit. The control system however assures discontinuation of the forward discharge driving operation of the motor 53 and closing of the valve 14' each time the mold and injecting unit undergo relative separatory movements.

When the material in the mold has been solidified to a desired extent, the operating lever 107 is rotated in a counterclockwise direction, as viewed in Fig. 1, to supply fluid pressure to the upper end of the cylinder 98 thus rotating the injecting unit in a clockwise direction about its pivot 74. The switch 144 is opened as a result of the counter-clockwise rotation of the lever 107 and supply of current to the coil 151 of the ratchet mechanism is consequently discontinued, permitting the spring 153' to urge the armature 152 leftwardly in order to condition the dog 153 to perform another indexing operation upon the ratchet wheel 154 and hexagonal block 156 for the purpose of re-establishing engagement of the brush contact element 160 with one of the contact elements on the insulating block 156 to pre-set the control system for another cycle.

In the event the relative approaching movement of the injecting unit and mold, which occurs during contraction of the nozzle following filling of the mold, is insufficient to engage the contacts of the switches 163 and 166, no precaution is required to prevent unintended opening of the valve 14' and energizing of the motor 53 but in this event, the ratchet mechanism is not advanced to bring the brush contact 160 into engagement with a blank side of the hexagonal block 156. Thus when the switch 144 is subsequently closed at the beginning of the next molding cycle, the ratchet mechanism will be advanced one step thereby breaking the circuit between the brush contact 160 and one of the contact elements 157 of the hexagonal block 156. This condition can be corrected by opening and closing the switch 144 without moving the valve handle 197 sufficiently to effectively change the setting of the hydraulic control valve 104.

I claim:

1. Apparatus for injecting moldable material into a mold having an inlet including an injecting unit provided with a discharge passage and means for displacing material therethrough, a valve adapted to close said passage, a discharge nozzle having telescoping relatively shiftable nozzle sections, one of said sections being carried by said injecting unit and yieldably held in spaced relation to said mold by the other nozzle section when the mold is initially filled, said second mentioned nozzle section being registerable with said mold inlet and movable outwardly with respect to said first mentioned nozzle section by the pressure of the material in said nozzle when said mold is filled for yieldably spacing said first-mentioned nozzle section from said mold, means relatively shiftably mounting said injecting unit and mold for bringing said nozzle into and out of mold-filling relationship with respect to said mold inlet, mechanism for relatively urging said injecting unit and mold toward their mold-filling relationship and shifting said second mentioned nozzle section inwardly with respect to said first mentioned nozzle section for maintaining pressure upon the contents of said mold and displacing material from said nozzle into said mold to compensate for shrinkage of the material therein when said valve is closed.

2. Apparatus for injecting moldable material into a mold having an inlet including an injecting unit provided with a discharge passage and means for displacing material therethrough, a discharge nozzle having a body portion carried by said injecting unit and a relatively extensible and retractable section registerable with said mold inlet and yieldably holding said injecting apparatus and nozzle body portion in spaced relation to said mold during mold-filling operations, said nozzle section being movable outwardly relative to said nozzle body portion by the pressure of the material in said nozzle when said mold is filled, means for relatively urging said nozzle and mold toward each other, said nozzle section being movable toward said body portion of said nozzle by the force under which said nozzle and mold are urged toward each other for displacing material from said nozzle into said mold to compensate for shrinkage of the material therein following a mold-filling operation.

3. In combination, a mold having an inlet opening and apparatus for injecting a moldable material into said inlet opening including an injecting unit comprising a relatively extensible and contractable nozzle having telescoping body and discharge portions, said discharge portion of said nozzle having a discharge passage communicating with said inlet opening, means in said injecting unit for discharging said material through said passage, mechanism for driving said means, said mold and injecting unit being relatively movable to accommodate extension of said discharge portion of said nozzle relative to said body portion of said nozzle in response to pressure of the material in said nozzle upon complete filling of said mold, means for discontinuing operation of said driving mechanism after said mold has been filled, and means for relatively moving said injecting unit and mold toward each other for contracting said nozzle to displace material therefrom into said mold during shrinkage of the material in the mold following filling thereof.

4. In combination, a mold having an inlet opening and apparatus for injecting a moldable material into said inlet opening including an injecting unit comprising a relatively extensible and contractable nozzle having telescoping body and discharge portions, said discharge portion of said nozzle having a discharge passage communicating with said inlet opening, means in said injecting unit for discharging said material through said passage, mechanism for driving said means, said mold and injecting unit being relatively movable to accommodate extension of said discharge portion of said nozzle in response to pressure of the material in said nozzle upon complete filling of said mold, a control system for said driving mechanism including means actuated in response to said relative movement of said injecting unit and mold for discontinuing operation of said driving mechanism, and means for relatively moving said injecting unit and mold toward each other for contracting said nozzle to displace material therefrom into said mold during shrinkage of the material in the mold following filling thereof.

5. In combination, a mold having an inlet opening and apparatus for injecting a moldable material into said inlet opening including an injecting unit having a discharge passage and comprising a relatively extensible and contractable nozzle communicating with said passage, said nozzle having a body portion carried by said injecting unit and a relatively shiftable telescoping discharge portion provided with an outlet communicating with the inlet opening of said mold, a valve member in said discharge passage of said injecting unit, means in said injecting unit for discharging material through said passage and nozzle, mechanism for driving said means, said mold and injecting unit being relatively movable to accommodate extension of said discharge portion of said nozzle in response to pressure of the material in said nozzle upon complete filling of said mold, a control system including means for simultaneously closing said valve and discontinuing operation of said driving mechanism upon complete filling of said mold, and means for relatively moving said injecting unit and mold toward each other for contracting said nozzle therebetween and displacing material from said nozzle into said mold to compensate for shrinkage of the material in the mold following completion of filling thereof.

6. In combination, a mold having an inlet opening and apparatus for injecting a moldable material into said inlet opening including an injecting unit having a discharge passage and comprising a relatively extensible and contractable nozzle communicating with said passage, said nozzle having a body portion carried by said injecting unit and a relatively shiftable telescoping discharge portion provided with an outlet communicating with the inlet opening of said mold, a valve member in said discharge passage of said injecting unit, means in said injecting unit for discharging material through said passage and nozzle, mechanism for driving said means, said mold and injecting unit being relatively movable to accommodate extension of said discharge portion of said nozzle in response to pressure of the material in said nozzle upon complete filling of said mold, a control system including means actuated in response to said relative movement of said injecting unit and mold for closing said valve and discontinuing operation of said driving mechanism upon complete filling of said mold, and means for relatively urging said injecting unit and mold toward each other for contracting said nozzle therebetween and displacing material from said nozzle into said mold to compensate for shrinkage of the material in the mold following completion of filling thereof.

7. A nozzle for conveying moldable material from an injecting unit to a mold inlet under pressure comprising an outer body portion securable to said injecting unit and having a passage therein, spaced opposed continuous circular internal shoulders extending inwardly of said passage, and a discharge element shiftably mounted in said passage having a head portion disposed between said shoulders and provided with continuous circular abutment surfaces, one engageable in sealing relationship with each of said shoulders, respectively, for obstructing the flow of moldable material between the adjacent surfaces of said body and discharge portions of said nozzle one of the engageable continuous circular surfaces on said discharge element being located at the inlet end thereof.

8. A nozzle for conveying moldable material from an injecting unit to a mold inlet under pressure comprising an outer tubular body portion securable to said injecting unit and having an axial bore, a continuous circular shoulder in said body portion extending inwardly of said bore, and a tubular discharge element shiftably mounted in said bore in close-fitting relationship with respect to the wall of said bore and having an extremity shaped to fit said mold inlet and an opposite extremity engageable with said shoulder of said tubular body portion for limiting inward movement of said discharge element and holding plastic material from flowing between said body portion and discharge element, said shoulder being located inwardly of said body portion beyond the space therein occupied by said discharge element.

9. In combination, a mold having an inlet opening and apparatus for injecting a moldable material into said inlet opening including an injecting unit having a discharge passage and comprising a relatively extensible and contractable nozzle communicating with said passage, said nozzle having a body portion carried by said injecting unit and a relatively shiftable telescoping discharge portion provided with an outlet communicating with the inlet opening of said mold, a valve member in said discharge passage of said injecting unit, means in said injecting unit for discharging material through said passage and nozzle, mechanism for driving said means, means relatively shiftably mounting said injecting unit and mold, said mold and injecting unit being relatively shiftable by pressure of the material in the mold when the latter is filled for accommo-dating extension of said discharge portion of said nozzle, a control system for said valve and driving mechanism including means for simultaneously opening said valve and actuating said driving mechanism and simultaneously closing said valve and discontinuing operation of said driving mechanism in response to relative approaching and separatory movements respectively of said injecting unit and mold, said control system including means for rendering it inoperative to open said valve and to actuate said driving mechanism in response to the first relative approaching movement of said injecting unit and mold following a mold-filling operation, and means relatively urging said injecting unit and mold toward each other for contracting said nozzle therebetween and displacing material from said nozzle into said mold immediately after said valve is closed and operation of said driving mechanism is discontinued.

10. In combination, a mold having an inlet opening, an injecting unit for discharging moldable material into said mold, means relatively shiftably mounting said mold and injecting unit, means in said injecting unit for displacing moldable material therefrom into said mold, driving mechanism for said displacing means, said mold and injecting unit being relatively shiftable in a separatory direction by the back pressure of the material in said mold when said mold is filled, and a control system for said driving mechanism including means responsive to alternate approaching movements of said mold and injecting unit for actuating said driving mechanism and responsive to successive back pressure produced separatory movements of said mold and injecting unit for discontinuing operation of said driving mechanism.

11. In combination, a mold having an inlet opening, an injecting unit for discharging moldable material into said mold having a discharge passage, a valve in said passage, valve operating mechanism means relatively shiftably mounting said mold and injecting unit, means in said injecting unit for displacing moldable material therefrom into said mold, driving mechanism for said displacing means, said mold and injecting unit being relatively shiftable in a separatory direction by the back pressure of the material in said mold when said mold is filled, and a control system for said driving and valve operating mechanisms including means responsive to alternate approaching movements of said mold and injecting unit for simultaneously actuating said driving mechanism and opening said valve and responsive to successive back pressure produced separatory movement of said mold and injecting unit for simultaneously discontinuing operation of said driving mechanism and closing said valve.

12. In combination, a mold having an inlet opening and apparatus for injecting a moldable material into said inlet opening including an injecting unit comprising a relatively extensible and contractable nozzle having telescoping body and discharge portions, said discharge portion of said nozzle having a discharge passage communicating with said inlet opening, means in said injecting unit for discharging said material through said passage, mechanism for driving said means, said mold and injecting unit being relatively movable to accommodate extension of said discharge portion of said nozzle relative to said body portion of said nozzle in response to pressure of the material in said nozzle upon complete filling of said mold, a control system for said driving mechanism including means responsive to relative approaching and separatory movements of said mold and injecting unit for respectively actuating said driving mechanism and discontinuing operation of said driving mechanism after said mold is filled, and means relatively urging said injecting unit and mold toward each other for contracting said nozzle to displace material therefrom into said mold during shrinkage of the material in the mold following filling thereof, said control system including means for rendering it ineffective to actuate said driving mechanism in responsive to the first relative approaching movement of said mold and injecting unit following a mold-filling operation.

13. In combination, a mold having an inlet opening and apparatus for injecting a moldable material into said inlet opening including an injecting unit having a discharge passage and comprising a relatively extensible and contractable nozzle communicating with said passage, said nozzle having a body portion carried by said injecting unit and relatively shiftable telescoping discharge portion provided with an outlet communicating with the inlet opening of said mold, a valve member in said discharge passage of said injecting unit, valve operating mechanism, means in said injecting unit for discharging material through said passage and nozzle, mechanism for driving said means, said mold and injecting unit being relatively movable to accommodate extension of said discharge portion of said nozzle in response to pressure of the material in said nozzle upon complete filling of said mold, a control system for said driving and valve operating mechanisms including means responsive to relative approaching and separatory movements of said mold and injecting unit for respectively simultaneously opening said valve and actuating said driving mechanism and simultaneously closing said valve and discontinuing operation of said driving mechanism, means for relatively urging said injecting unit and mold toward each other for contracting said nozzle therebetween and displacing material from said nozzle into said mold to compensate for shrinkage of the material in the mold following completion of filling thereof, said control system including means for rendering it ineffective to actuate said driving mechanism and open said valve in response to the first relative approaching movement of said mold and injecting unit following a mold-filling operation.

14. The method of molding plastic compound which comprises the steps of yieldably urging an extensible and contractable plastic discharge nozzle and the inlet of a mold in engaged mold-filling relationship with said nozzle contracted by engagement with said mold inlet, injecting a mold-filling charge of said compound under pressure through a passage communicating with said nozzle and through a passage in said nozzle into said mold inlet from a source of said compound under pressure, continuing the application of pressure on said source after said mold is filled and until the back pressure causes extension of said nozzle, discontinuing the application of pressure on said source substantially immediately after a predetermined extension of said nozzle, solidifying the plastic compound in said mold, and maintaining the pressure upon and compensating for shrinkage of the compound in said mold during solidification thereof by contractive displacement of compound from the passage of said nozzle.

WALTER P. COUSINO.

REFERENCES CITED

The following references are of record in the file of this patent:

UNITED STATES PATENTS

| Number | Name | Date |
|---|---|---|
| 2,367,204 | Cousino | Jan. 16, 1945 |
| 2,414,948 | Hermanns | Jan. 28, 1947 |